United States Patent [19]

Kohashi

[11] Patent Number: 4,488,785

[45] Date of Patent: Dec. 18, 1984

[54] DISPLAY DEVICE HAVING JUXTAPOSED CAPILLARY OPENINGS FOR GENERATING VARIABLE SURFACE CONCAVITIES

[75] Inventor: Tadao Kohashi, Moriguchi, Japan

[73] Assignee: Matsushita Electric Industrial Co., Ltd., Japan

[21] Appl. No.: 324,576

[22] Filed: Nov. 24, 1981

[30] Foreign Application Priority Data

Nov. 26, 1980 [JP] Japan ............... 55-166940

[51] Int. Cl.³ .................. G02F 1/29
[52] U.S. Cl. .................. 350/360
[58] Field of Search ............. 350/360, 361

[56] References Cited

U.S. PATENT DOCUMENTS

| 2,062,468 | 1/1936 | Matz | 350/360 |
|---|---|---|---|
| 4,010,321 | 3/1977 | Kohashi | 358/233 |
| 4,030,813 | 6/1977 | Kohashi et al. | 350/355 |
| 4,035,061 | 7/1977 | Sheridon | 350/360 |
| 4,182,553 | 1/1980 | Sheridon | 350/360 |

FOREIGN PATENT DOCUMENTS 484482 5/1938 United Kingdom .

Primary Examiner—Bruce Y. Arnold
Attorney, Agent, or Firm—Lowe, King, Price & Becker

[57] ABSTRACT

A light modulating display device comprises a liquid holding part and an optical part. The liquid holding part comprises a dielectric matrix within which a dielectric, light pervious liquid is axially movable under the influence of an electric field. The optical part comprises a multitude of capillary openings juxtaposed in a plane and extending axially from the matrix to permit the liquid to at least partially fill the openings. The transverse dimension of each opening is variable as a function of axial distance from the plane so that the liquid in each opening acquires a surface concavity depending on the distance of the liquid surface from the plane and hence on the intensity of the electric field. Light incident on the capillary openings is modulated in intensity according to the surface concavities.

39 Claims, 5 Drawing Figures

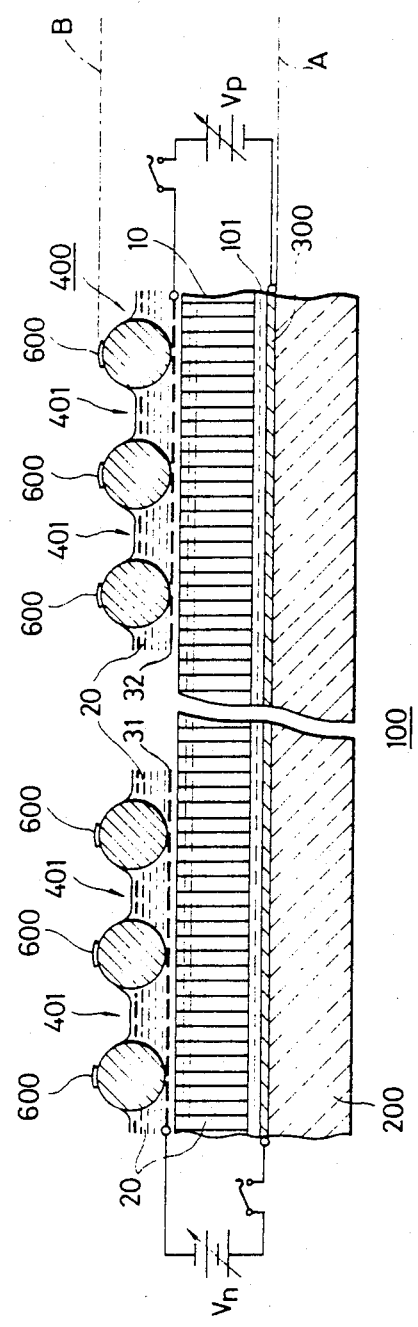

DISPLAY DEVICE HAVING JUXTAPOSED CAPILLARY OPENINGS FOR GENERATING VARIABLE SURFACE CONCAVITIES

BACKGROUND OF THE INVENTION

The present invention relates generally to display devices, and more particularly to a light modulating display device wherein an electrokinetically mobile, light pervious liquid is moved into and out of capillary openings under the influence of an electric field to cause variations in surface concavity of the liquid in the openings to modulate the light passing therethrough.

U.S. Pat. Nos. 4,010,321 and 4,030,813 assigned to the same assignee as the present invention disclose light modulating devices which comprise a layer of electroosmotically movable liquid of which the thickness is locally controlled in response to local loop currents produced by an electrostatic charge pattern. The charge pattern may be produced by a plurality of intersecting electrodes immersed in the liquid or by an accelerated intensity-modulated cathode ray beam scanned across the liquid layer. Light incident on the device is refracted by local gradients and projected onto a screen through the grille of a Schlieren lens system.

However, the use of a Schlieren lens system adds to the cost of the light modulating device and is not desirable for a wide range of applications. Further, the image contrast of the prior art light modulating device is still not satisfactory for practical applications.

SUMMARY OF THE INVENTION

It is therefore an object of the present invention to provide a light modulating display device which provides an improved image contrast while at the same time eliminating the need for employment of a Schlieren lens system.

This object is obtained by providing the display device with an optical part which comprises a multitude of axially extending capillary openings juxtaposed in a plane which is in contact with a liquid holding part in which light pervious electrokinetically mobile liquid is axially movable. The transverse cross-section of each opening is dimensioned so that it is variable as a function of axial distance from the plane. The capillary openings are at least partially filled with the liquid so that the surface of the liquid in each opening has a curvature or concavity which is variable as a function of the axial distance. Under the influence of an electric field generated in the liquid holding part, the liquid therein is moved axially so that the liquid in the openings is pushed further into or pulled out of the openings to cause variations in the surface concavities. Light incident on the capillary openings is modulated in intensity depending on the field-induced surface concavities.

The optical part of the device thus provides a lens effect which concentrates otherwise lost light rays onto a screen and improves the image contrast formed thereon.

In a preferred embodiment, the transverse dimension of the capillary openings is defined by contoured walls having continuously varying contour lines in the axial direction. Such contoured walls are defined by a mesh or lattice structure comprised of parallel fine wires having a circular cross-section. Alternatively, a metal plate may be used having a multitude of axially extending openings the transverse dimension of which is greater on one end thereof than on the other end.

BRIEF DESCRIPTION OF THE DRAWINGS

The present invention will be described in further detail with reference to the accompanying drawings, in which:

FIG. 1 is a view in cross-section of a light modulating device according to a preferred embodiment of the invention;

DETAILED DESCRIPTION

Figure 2A:
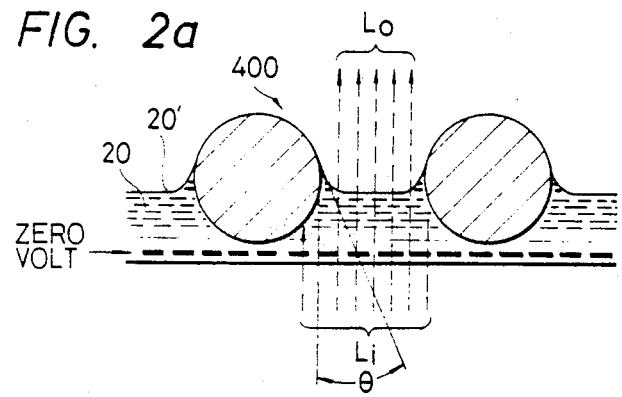
FIGS. 2a to 2c are schematic illustrations useful for describing the operation of the device of FIG. 1.

Referring to FIG. 1, there is shown a preferred embodiment of the display device of the invention generally designated at 100. The display device 100 comprises a light pervious glass support 200 which defines a surface A on which it supports a liquid layer 20 of light pervious, electroosmotically mobile material. On the glass support 200 is a light pervious electrode 300 formed of tin oxide or the like, which serves as a common electrode in this embodiment. Above the common electrode 300 is a porous member 10 such as microporous membrane filter or the like composed of a light transmissive dielectric material including cellulose acetate or cellulose nitrate. The porous member 10 has a thickness of from 50 to 200 micrometers with the pores having an average diameter of from 0.1 to 8 micrometers extending across its thickness. The porous member 10 is impregnated with the light transmissive liquid 20 which may be supplied through a space 101 between the common electrode 300 and porous member 10. Liquid 20 has a resistivity of at least $10^7$ ohm-cm and a refractive index which is in a range of $1.472 \pm 0.010$ for cellulose acetate or in a range of $1.505 \pm 0.010$ for cellulose nitrate so that the liquid is matched in refractive index with the porous member 10 to render the latter pervious to incident light.

Suitable material for the electroosmotic liquid 20 includes a composition of $\gamma$-methacryloxypropyltrimethoxy-silane (nd = 1.429) and $\alpha$-methylnaphthalene (nd = 1.615) which are mixed in such a proportion that the combined refractive index is approximately 1.472 for a cellulose acetate porous member, or dimethyl-triphenyl-trimethoxy-siloxene having a refractive index of approximately 1.511 if for a cellulose nitrate porous member.

Light transmissive metal-oxide segment electrodes 31 and 32, are provided on the upper surface of the porous member 10 by sputtering indium tin oxide compound, for example, to such a thickness as to permit the liquid to penetrate therethrough. The segment electrodes 31, 32 may be configured in a desired shape or arranged in the form of elemental electrodes in a row-and-column pattern corresponding to picture elements of a video image.

Generally designated by numeral 400 on the segment electrodes 31, 32 is a capillary member, or means for forming a multitude of axially extending openings or interstices 401 which generally defines a surface B axially spaced from the surface A. The transverse cross-sectional area of each opening 401 is variable as a function of distance from the underlying segment electrodes 31 and 32 to which the capillary member may be cemented by adhesive or on which it may be simply positioned.

The capillary member 400 may comprise a layer of particles of glass or alumina having an average diameter of 1 to 40 micrometers, or a plurality of metallic parallel thin wires (artificial or natural fibers) of a diameter ranging from 5 to 40 micrometers in the form of a lattice structure. A mesh of parallelly arranged grid structures, either conductive or insulative, with a thickness of from 20 to 150 micrometers is also found suitable. The capillary member 400 preferably has a light absorbing (opaque) nature to provide a satisfactory image contrast. However, a light transmissive material is also usable.

The capillary member 400 typically comprises an intertwined wire structure with a mesh value of more than 200 (or openings per inch) formed of conductive or insulative wires having a diameter 10 to 30 micrometers, or formed of a 10-to-200 micrometer thick metal sheet having openings 20 to 160 micrometers in diameter and spacing.

Since cellulose acetate and cellulose nitrate are composed of a transparent dielectric material, the porous member 10 is rendered transparent when impregnated with liquid of a refractive index corresponding to the refractive index of such dielectric material to a precision of the second decimal place of rounded figures.

The liquid 20 is supplied so that it overflows the porous member 10 and partially fills the openings 401 above. If no potential is applied to any of the segment electrodes 31 and 32, capillary attraction causes the liquid 20 to rise above mean level at the points of contact with the walls of the openings 401 so that the liquid forms a wet contact of acute angle $\theta$ as illustrated in FIG. 2a. Thus there is formed a downwardly concaved surface 20' which presents a plano-concave lens effect to upwardly directed light beams. This concavity is a function of the wet contact angle $\theta$ and hence as a function of the height of liquid contained in the openings 401. The portion of input light Li falling on the perimetrical area of the liquid is partially refracted radially outwardly by an amount proportional to the degree of concavity and absorbed by the walls of the capillary member 400 if the latter is made up of an opaque material and partially reflected backward as shown at Lr, while the portion of the light which falls on the center area of the openings follows a straight path as indicated by arrows Lo.

Figure 2B:
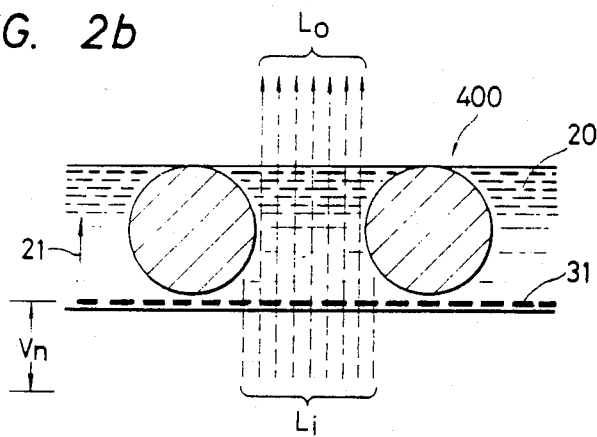

When negative potential Vn is applied to the segment electrode 31 with respect to the common electrode 300 as shown in FIG. 2b, electroosmosis causes the liquid 20 to move axially through the porous member 10 to the overlying segment electrode 31 as indicated by an arrow 21 and passes through it into the opening 401, causing the liquid therein to move to a higher level to increase the wetted area of the capillary openings 401.

Therefore, the surface concavity of liquid in each opening 401 thus decreases as a function of the applied negative potential until the surface 20' becomes almost flat as shown in FIG. 2b. Thus, the display device 100 acquires a lens effect of decreasing concavity as a function of the applied negative voltage. As a result, the amount of light output increases as a function of the applied negative voltage.

Figure 2C:
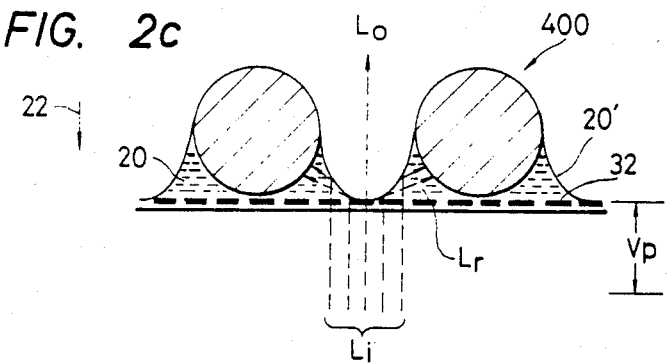

If positive potential Vp is applied to the segment electrode 32 with respect to the common electrode 300, the electroosmotic movement is in an opposite direction as indicated by arrow 22 (FIG. 2c) causing the liquid to move to a lower surface level. Since the direction of this movement is opposite to the direction in which the capillary force is acting on the liquid, the central area of the liquid is more easily movable downward than the perimetrical area of the liquid is. This causes the surface concavity of the liquid to increase progressively as the liquid moves to a lower surface level with an increase in the positive potential. Therefore, the display device acquires a lens effect of increasing concavity as a function of the applied positive voltage. The amount of light output thus decreases as a function of the applied positive potential. When a contact angle of critical value is reached, the incident light is totally reflected back and no light output is produced.

It is seen therefore that by applying different potentials of different polarities to different segment electrodes, it is possible to project an intensity modulated, halftone or two-valued optical image onto a screen.

The light transmission performance of the device is improved by decreasing the size of the openings 401 and increasing the number of openings per unit area and the voltage versus light output performance is improved by decreasing the amount of liquid flowings into and out of the openings 401, which may be achieved by decreasing the effective thickness of the capillary member 400 and the size of openings 401.

In a practical aspect of the invention, the display device of the invention is found to operate effectively in a voltage range of 0.5 to 2 volts for a unit thickness value of 1 micrometer of the porous layer 10. For experimental purposes, a display device was constructed of a cellulose nitrate porous layer 10 having a thickness of 150 micrometers and an average pore diameter of 0.8 micrometers and a porosity of 80% (nd=1.504). To serve as the electroosmotic liquid 20, use was made of dimethyltriphenyl-trimethoxy-siloxene (nd=1.511, critical angle=41.4 degrees, specific resistivity=$5.5 \times 10^{10}$ ohms, viscocity=10 centistokes, contact angle=8 degrees with respect to molybdenum). The capillary member 400 comprised a molybdenum mesh using wires of 25 micrometers in diameter, which were intertwined to have a 150 mesh value and was arranged to function as the segment electrodes. A contrast ratio of 1:5 is obtained for unipolar operations in which operating voltage of 150 volts (equivalent to 1 volt/micrometer), either negative or positive, was used. In bipolar operations a contrast ratio of 1:10 was obtained in a range of voltages from $-150$ to $+150$ volts.

By appropriately dimensioning the size and number of openings 401 so that the latter is wetted to a maximum level by capillary action under normal, de-energized conditions, the device 100 permits the use of only positive voltage for light transmission control. Alternatively, the surface level of the liquid in the openings 401 may be reduced to a minimum level close to the underlying segment electrodes 31, 32 to permit the device 100 to operate only in response to negative voltages.

In a preferred embodiment of the present invention, the upper side of the capillary member 400 is applied with a layer of a liquid-repellent material, or oil barrier (fluorinated polymer) 600 having a surface tension of typically 11 dynes per centimeter to prevent the liquid from overly wetting the capillary member causing instability in the operation of the device. Suitable repellent material is available as the type FLUORAD FC-721 from Minnesota Mining and Manufacturing Co.

Figure 3:
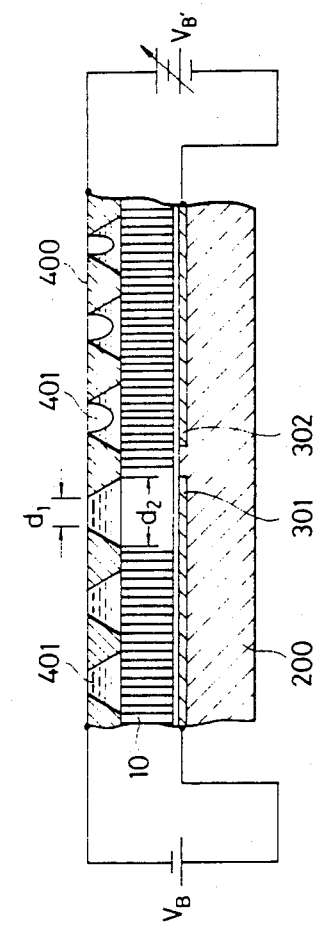
FIG. 3 is an illustration of another preferred embodiment of the invention.

An alternative embodiment of the present invention is illustrated in FIG. 3 in which the capillary member 400 comprises an iron or steel mesh structure having a thickness of from 100 to 140 micrometers. The openings 401 are provided at a density as greate as 100 per inch by photoetching technique so that they have a smaller diameter $d_1$ (typically 70 to 100 micrometers) on the upper side thereof and a larger diameter $d_2$ (typically 140 to 160 micrometers) on the lower side so that the liquid in the openings 401 has an acute wet contact. Alternatively, the openings 401 are so shaped that their upper side has a larger diameter to permit the liquid to have an obtuse wet contact. In this embodiment the capillary member 400 is arranged to serve as a common electrode and is connected to the positive and negative terminals of a constant voltage source $V_B$ and a variable voltage source $V_B'$, and light transmissive segment electrodes 301 and 302 are provided between the transparent baseplate 200 and the porous layer 10. The segment electrodes 301 and 302 are connected to the positive terminal of voltage source $V_B$ and to the negative terminal of voltage source $V_B'$, respectively. The liquid filled in the openings 401 above the segment electrode 301 is raised to the upper surface of the capillary member 400 by the electroosmosis under the influence of the negative potential applied to the common electrode 400 with respect to the underlying electrode 301. On the other hand, the liquid in the openings 401 above the segment electrode 302 is pulled downward by the downwardly acting electroosmosis the magnitude of which is a function of the varying voltage $V_B'$, so that the surface of the liquid is downwardly concaved and therefore the light transmittance is decreased as a function of the applied turn-off voltage $V_B'$. By appropriately proportioning the ratio of $d_1$ to $d_2$, a lens effect of a significantly large concavity is obtained.

Due to the provision of the lens effect, the display device of the present invention eliminates the use of a Schlieren lens system which is required of conventional light modulating display devices.

In the foregoing description, the incident light is directed in a direction from the surface A to surface B, the display device could equally as well operate with an incident light directed in an opposite direction.

The display device could also be altered to operate in a reflective mode rather than in the transmissive mode by making the electrodes 300, 301 and 302, which are located adjacent to the porous layer 10 remote from the capillary member 400, with a light reflective material and irradiating the device in a direction from the surface B. In that instance the application of voltage $V_B$ reduces the light intensity and the application of voltage $V_B'$ increases the light intensity.

Use of colored material for the porous layer 10 also renders the display device operable in the reflective mode since it causes the $V_B$ potential-applied areas to reflect colored light, while the $V_B'$ potential-applied areas to reflect white light of which the intensity is proportional to the applied voltage $V_B'$. The device of the invention could also be made to operate as a color display of either reflective or transmissive type by coating color ink on a surface of the porous member 10 or on the light transmissive electrodes 31, 32.

In the previous embodiments, the electroosmotically mobile liquid 20 has a wet contact of less than 90 degrees. The display device of the invention could also be operable with the use of an electroosmotically mobile liquid having a wet contact of more than 90 degrees.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A display device having first and second axially spaced apart surfaces, comprising:
    a layer of light transmissive liquid lying parallel to and adjacent to said first surface;
    means for forming a plurality of openings juxtaposed in a plane parallel to said liquid layer, said openings extending axially from said liquid layer to said second surface and at least partially filled with the liquid, the transverse dimension of each opening being variable as a function of distance from one end of the opening so that capillary action causes the liquid therein to form a variable surface concavity as a function of said distance; and
    means for axially moving a portion of said liquid into and out of said openings, under the influence of an electric field, to cause variations in said surface concavity as a function of the intensity of said electric field, whereby light rays axially passing through said openings are modulated in intensity with said electric field.

2. A display device as claimed in claim 1, wherein the transverse dimension of each of said openings, measured at each of the opposite ends thereof, is greater than the transverse dimension thereof measured at a point intermediate said opposite ends.

3. A display device as claimed in claim 1, wherein the transverse dimension of each of said openings, measured at one end thereof, is greater than the transverse dimension of the opening measured at the other end thereof.

4. A display device as claimed in claim 1, 2, or 3, wherein each of said openings is defined by a pair of walls convexed in transversely opposite directions toward each other.

5. A display device as claimed in claim 2 or 3, wherein at least part of each of said openings is defined by a contoured wall.

6. A display device as claimed in claim 1 wherein said means for forming a plurality of openings comprises a plurality of particles arranged in a layer and positioned so as to form said plurality of openings among said particles.

7. A display device as claimed in claim 1, wherein said means for forming a plurality of openings comprises a plurality of parallel wires.

8. A display device as claimed in claim 7, wherein said parallel wires are arranged as a mesh structure.

9. A display device as claimed in claim 1 wherein at least part of each of said openings is defined by a contoured wall.

10. A display device as claimed in claim 9, wherein said contoured wall is defined by part of a circle.

11. A display device as claimed in claim 1, 10, 6, 7, or 8 wherein said opening forming means comprises a light absorptive material.

12. A display device as claimed in claim 1, 10, 6, 7, or 8, further comprising means for rendering the portion of said opening forming means remote from said liquid layer repellent to said liquid.

13. A display device as claimed in claim 1, wherein said liquid comprises an electroosmotically movable material, and wherein said liquid moving means comprises:
- a layer of porous, light-transmissive dielectric material arranged parallel to said liquid layer having a multitude of axially extending pores and a refractive index which is matched to the refractive index of said liquid so that the porous layer is rendered light transmissive, the porosity of said layer being such that the latter is impregnated with a portion of said electroosmotically movable liquid; and
- means for generating an electric field across the thickness of said porous layer to cause said impregnating liquid to electroosmotically move through said pores in an axial direction into and out of said openings.

14. A display device as claimed in claim 13, wherein said field generating means comprises a first light transmissive electrode on one side of said porous layer and a second light transmissive electrode on the other side of the porous layer, said first and second electrodes being adapted for connection to a voltage source.

15. A display device as claimed in claim 14, wherein said first electrode is divided into a plurality of segments to which a voltage is selectively applied with respect to said second electrode.

16. A display device as claimed in claim 13, wherein said opening forming means comprises a conductive mesh structure adapted for connection to one terminal of a voltage source, and wherein said field generating means comprises an electrode located adjacent to said porous layer remote from said conductive mesh structure and connected to the other terminal of said voltage source.

17. A display device as claimed in claim 16, wherein one of said conductive mesh structure and said electrode is divided into a plurality of segments to which a voltage is selectively applied.

18. A display device as claimed in claim 16, wherein said electrode is formed of a light transmissive material.

19. A display device as claimed in claim 16, wherein said electrode is formed of a light reflective material.

20. A display device as claimed in claim 13, wherein said openings are filled by said liquid to a minimum or maximum surface level in the absence of said electric field to cause said liquid to be rendered movable in a direction to raise or lower said surface level in response to a potential of a polarity depending on the surface levels of said liquid during the absence of said electric field.

21. A display device as claimed in claim 13, wherein said openings are filled by said liquid to an intermediate level in the absence of said electric field to cause said liquid to be rendered movable in opposite directions with respect to said intermediate level in response to a potential of opposite polarities.

22. A display device comprising:
- means having a plurality of axially extending capillary openings juxtaposed in a plane, the transverse dimension of each said opening being variable as a function of distance from said plane; and
- means holding a light transmissive electrokinetically mobile liquid in the form of a layer in contact with said openings so that said capillary openings are at least partially filled with said liquid, thereby forming a surface concavity in each capillary opening and adapted to be biased to electrical potentials for electrokinetically moving a portion of the liquid into and out of said openings to cause variations in said surface concavity.

23. A display device as claimed in claim 22, wherein said transverse dimension of said openings varies continuously as a function of said distance.

24. A display device as claimed in claim 22 or 23, wherein said liquid containing and moving means includes a dielectric matrix having a multitude of axially extending pores in communication with said capillary openings to contain said liquid in said pores and to move the liquid within said matrix.

25. A display device as claimed in claim 24, further comprising a support on which said liquid containing and moving means is supported.

26. A display device as claimed in claim 25, wherein said support comprises a light transmissive material.

27. A display device as claimed in claim 17 wherein said electrode is formed of a light transmissive material.

28. A display device as claimed in claim 17 wherein said electrode is formed of a light reflective material.

29. A display device as claimed in claim 12 wherein said openings are filled by said liquid to a minimum or maximum surface level in the absence of said electric field to cause said liquid to be rendered movable in a direction to raise or lower said surface level in response to a potential of a polarity depending on the surface levels of said liquid during the absence of said electric field.

30. A display device as claimed in claim 14 wherein said openings are filled by said liquid to an intermediate level in the absence of said electric field to cause said liquid to be rendered movable in opposite directions with respect to said intermediate level in response to a potential of opposite polarities.

31. A display device as claimed in claim 15 wherein said openings are filled by said liquid to a minimum or maximum surface level in the absence of said electric field to cause said liquid to be rendered movable in a direction to raise or lower said surface level in response to a potential of a polarity depending on the surface levels of said liquid during the absence of said electric field.

32. A display device as claimed in claim 15 wherein said openings are filled by said liquid to an intermediate level in the absence of said electric field to cause said liquid to be rendered movable in opposite directions with respect to said intermediate level in response to a potential of opposite polarities.

33. A display device as claimed in claim 16 wherein said openings are filled by said liquid to a minimum or maximum surface level in the absence of said electric field to cause said liquid to be rendered movable in a direction to raise or lower said surface level in response to a potential of a polarity depending on the surface levels of said liquid during the absence of said electric field.

34. A display device as claimed in claim 16 wherein said openings are filled by said liquid to an intermediate level in the absence of said electric field to cause said liquid to be rendered movable in opposite directions with respect to said intermediate level in response to a potential of opposite polarities.

35. A display device as claimed in claim 17 wherein said openings are filled by said liquid to a minimum or maximum surface level in the absence of said electric field to cause said liquid to be rendered movable in a direction to raise or lower said surface level in response to a potential of a polarity depending on the surface levels of said liquid during the absence of said electric field.

36. A display device as claimed in claim 17 wherein said openings are filled by said liquid to an intermediate level in the absence of said electric field to cause said liquid to be rendered movable in opposite directions with respect to said intermediate level in response to a potential of opposite polarities.

37. A display device as claimed in claim 7 wherein said openings are formed between adjacent ones of said polarity of parallel wires.

38. A display device as claimed in claim 10, 6, 7 or 8 wherein said liquid comprises an electroosmotically movable material, and wherein said liquid moving means comprises:
 a layer of porous, light-transmissive dielectric material arranged parallel to said liquid layer having a multitude of axially extending pores and a refractive index which is matched to the refractive index of said liquid so that the porous layer is rendered light pervious, the porosity of said layer being such that the latter is impregnated with a portion of said electroosmotically movable liquid; and
 means for generating an electric field across the thickness of said porous layer to cause said impregnating liquid to electroosmotically move through said pores in axial direction into and out of said openings.

39. A display device having first and second axially spaced apart surfaces, comprising:
 a layer of light transmissive liquid lying parallel to and adjacent to said first surface;
 means for forming a plurality of openings juxtaposed in a plane parallel to said liquid layer, said openings extending axially from the liquid layer to said second surface, the transverse dimension of each opening being variable as a function of distance from one end of the openings so that capillary action causes liquid therein to form a surface concavity which is variable as a function of said distance from one end and which causes light rays axially projected through the openings to be modulated in intensity; and
 means axially spaced from said opening forming means for axially moving a portion of said liquid into and out of said openings under the influence of an electric field to cause variations in said surface concavity as a function of the intensity of said electric field.

* * * * *